United States Patent [19]

Linde et al.

[11] 4,025,266

[45] May 24, 1977

[54] INJECTION MOLDING MACHINE

[75] Inventors: Joachim Linde, Leiselheim; Wolfgang Späth, Lahr, both of Germany

[73] Assignee: Klockner-Werke AG, Duisburg, Germany

[22] Filed: Nov. 5, 1975

[21] Appl. No.: 629,079

[30] Foreign Application Priority Data

Nov. 13, 1974 Germany .......................... 2453696

[52] U.S. Cl. .................... 425/242 R; 425/451.2; 425/451.9; 425/DIG. 221; 425/DIG. 223; 425/451.7

[51] Int. Cl.² .......................................... B29F 1/00

[58] Field of Search ............ 425/242, 450.1, 451.2, 425/451.7, 451.9, DIG. 221, DIG. 223

[56] References Cited

UNITED STATES PATENTS

| | | | |
|---|---|---|---|
| 2,862,238 | 12/1958 | Cuzzi | 425/451.2 |
| 3,245,122 | 4/1966 | Mauder | 425/DIG. 223 |
| 3,327,353 | 6/1967 | Eggenberger | 425/451.7 X |
| 3,543,346 | 12/1970 | Breher | 425/242 R |

FOREIGN PATENTS OR APPLICATIONS 43,885  11/1966  Germany .................... 425/242 R

*Primary Examiner*—Robert L. Spicer, Jr.
*Attorney, Agent, or Firm*—Michael J. Striker

[57] ABSTRACT

An injection molding machine includes a stationary frame having a pair of spaced upright stationary plates which guide rods of a movable frame which includes, at opposite ends of the rods projecting beyond the stationary plates, a pair of movable plates. One of the stationary plates and the movable plate adjacent thereto respectively carry complementary parts of a split injection mold. A unit including a pressure plate fixed to the other stationary plate is arranged on the rods between the other of the stationary plates and the movable plate adjacent thereto. Cylinder and piston arrangement connects the unit and the movable plate adjacent thereto for moving the movable frame relative to the stationary frame and therewith the mold parts between open and closed positions. The unit includes a clamping device for clamping the unit in fixed position onto the rods a hydraulically operated arrangement cooperating with the pressure plate for preventing the mold parts, when in the closed position from opening under the pressure of the material injected thereinto.

8 Claims, 3 Drawing Figures

INJECTION MOLDING MACHINE

BACKGROUND OF THE INVENTION

The present invention relates to an injection molding machine with a stationary frame which guides rods of a movable frame for movement in longitudinal direction. The end of the rods which project beyond spaced upright plates of the stationary frame respectively carry fixed thereto a pair of movable plates one of which carries fixed thereto a half of a split mold opposite the other half which is fixed to the stationary plate adjacent this one movable plate. A unit including a pressure plate fixed to the other stationary plate is mounted between the latter and the other movable plate and is connected to the other movable plate by cylinder and piston means for moving the movable frame relative to the stationary frame and therewith the mold parts between open and closed positions. The unit includes a clamping device for clamping the unit in fixed position on the rods and hydraulically operated means cooperating with the pressure plate for preventing the mold parts, when in the closed position, from opening under the pressure of the material injected thereto.

Injection molding machines usually have a split mold of which one part is usually mounted on a fixed plate whereas the other part is mounted on a plate movable toward and away from the fixed plate. Cylinder and piston means are provided for moving the two mold parts between an open and a closed position. The material from which the molded article is to be formed is fed under pressure into the cavity of the mold when the two mold parts are in closed position and the pressure at which the molded material is injected into the mold cavity tends to open the split mold. In order to avoid such an opening of the split mold during the molding process, a force must be provided acting against the force created by the injected material and this counteracting force evidently must be at least as great as the force created by the injected material. The force created by the injected material is considerably greater than the force necessary for moving the mold halves to the closed position. In order to be able to move the two mold halves quickly between the open and the closed position, the cross-section of the cylinder provided for this purpose is held as small as possible and such cylinder and piston means will not provide the necessary force for maintaining the mold halves in the closed position under the pressure of the material injected thereinto. Therefore, in many injection molding machines an additional cylinder with a greater cross-section and a piston therein is provided for creating the necessary large force for holding the mold halves in the closed position during the injection process.

The German Pat. No. 1,234,977 discloses an injection molding machine including a stationary frame having two parallel, spaced stationary plates between which a plurality of tubular members extend in which guide rods of a movable frame are guided for movement in axial direction, which carry on opposite ends thereof, projecting beyond the stationary plates, a pair of movable plates, one of which carries half of a split mold movable toward and away from the other half which is mounted on the stationary plate adjacent thereto. A guide plate is mounted on the rods between the other of the stationary plates and the movable plate adjacent thereto and abutting on an adjustable spindle turnably mounted on the other of the movable plates. A hydraulically operated knuckle joint is connected to the guide plate and the stationary plate adjacent thereto for moving the movable frame relative to the stationary frame and therewith the two mold parts between the open and the closed position, and the knuckle joint provides also the necessary force for holding the two mold parts in closed position against the pressure of the material injected thereinto. This known construction has the disadvantage that the movable frame has to extend in the region of the knuckle joint far beyond the stationary frame especially in the closed position of the two mold halves.

An injection molding machine is disclosed in the German Auslegeschrift 1,242,356 which differs from the above-described machine in that the knuckle joint is used only for moving the movable frame relative to the stationary frame and therewith the two mold halves between open and closed position, whereas the means for creating the pressure counteracting the pressure produced by the material injected into the closed mold comprises a fluid actuated membrane mounted in the guide plate and cooperating with a plate fixed at one end of the adjustable spindle. This known construction has evidently the same disadvantages as the construction described above and in addition the guide plate construction is more complicated.

A further injection molding machine is disclosed in the German Auslegeschrift 1,529,902 which differs from those mentioned above. In this machine a plate carrying half of a split mold is guided between guide plates extending between two stationary plates for movement toward and away from one of the stationary plates which carries the other half of the split mold. A frame likewise guided by the guide plates has a central axially movable wedge acting on a pair of clamping members for clamping the frame in fixed position to the guide plates. After the split mold is closed, the central wedge is moved in axial direction by another wedge extending normal to the central wedge and engaging an end face of the latter to move the clamping members to a clamping position and the other wedge acts also on the movable plate to provide the necessary force for holding the split mold in closed position against the pressure of the material injected thereinto. This construction has the disadvantage that the force preventing opening of the split mold during the molding operation is not independent from the clamping pressure of the clamping members and the additional disadvantage that the construction is rather complicated.

SUMMARY OF THE INVENTION

It is an object of the present invention to provide an injection molding machine which avoids the above-described disadvantages of injection machines known in the art.

It is a further object of the present invention to provide for an injection molding machine having a relatively small length and which requires no additional devices for adjusting the machine for molds of different thickness.

It is an additional object of the present invention to provide for an injection molding machine in which the necessary force for holding the mold halves in closed position against the pressure of the material injected into the mold cavity is independent from the force used for bringing the two mold halves to the closed position.

With these and other objects in view, which will become apparent as the description proceeds, the injection molding machine according to the present invention mainly comprises stationary frame means having a pair of spaced, parallel stationary plates, movable frame means comprising a pair of movable plates parallel to and spaced further from each other than said stationary plates and a plurality of rods connecting the movable plates to each other for movement in the longitudinal direction of the rods. The rods are preferably guided for movement in longitudinal direction in guide tubes extending between the stationary plates fastened thereto. One part of the two-part injection mold is fastened to one of the stationary plates and the other of the two parts is fastened to the movable plate adjacent to the one stationary plate. Plate means are mounted on the rods between the other of the stationary plates and the movable plate adjacent thereto. The plate means comprise a pressure plate fixedly connected to the other of the stationary plates. Cylinder and piston means connect the plate means and the other of the movable plates for movement relative to each other together to move the one movable plate toward and away from the one stationary plate and the mold parts mounted thereon between open and closed positions. The machine includes clamping means for clamping the plate means to the rods, injection means for injecting material under pressure into the injection mold, when the mold parts are in the closed position, and means included in the plate means and cooperating with the pressure plate for providing a holding pressure preventing the mold parts from moving away from each other under the pressure of the material injected thereinto.

The clamping means preferably comprises a clamping cone mounted in the plane means between the rods and reciprocable in axial direction relative to the latter, and a plurality of clamping jaws engaging the conical surface of the clamping cone and being pressed in radial direction against the rods when the cone is moved in one axial direction. The plate means preferably comprises a guide frame encompassing the rods and the clamping jaws being guided in the frame. This will result in proper guiding of the clamping jaws.

The plate means preferably further includes a membrane plate between the large diameter end face of the cone and the pressure plate and a pair of membranes sandwiched between opposite faces of the membrane plate and the end face of the cone and the pressure plate, respectively. The membrane plate is provided with pressure spaces, adapted to be supplied with pressure fluid, for pressing the membranes against the end face of the cone and the pressure plate, respectively, to thereby move the cone in axial direction and to provide the necessary holding pressure preventing opening of the split mold under the pressure of the material injected thereinto.

Compression springs are respectively arranged on the side of the pressure plate and the cone facing away from the membrane plate for moving the membranes back to a rest position after discharge of the pressure fluid from the pressure spaces in the membrane plate.

The novel features which are considered as characteristic for the invention are set forth in particular in the appended claims. The invention itself, however, both as to its construction and its method of operation, together with additional objects and advantages thereof, will be best understood from the following description of specific embodiments when read connection with the accompanying drawing.

DESCRIPTION OF THE PREFERRED EMBODIMENT

Figure 1:
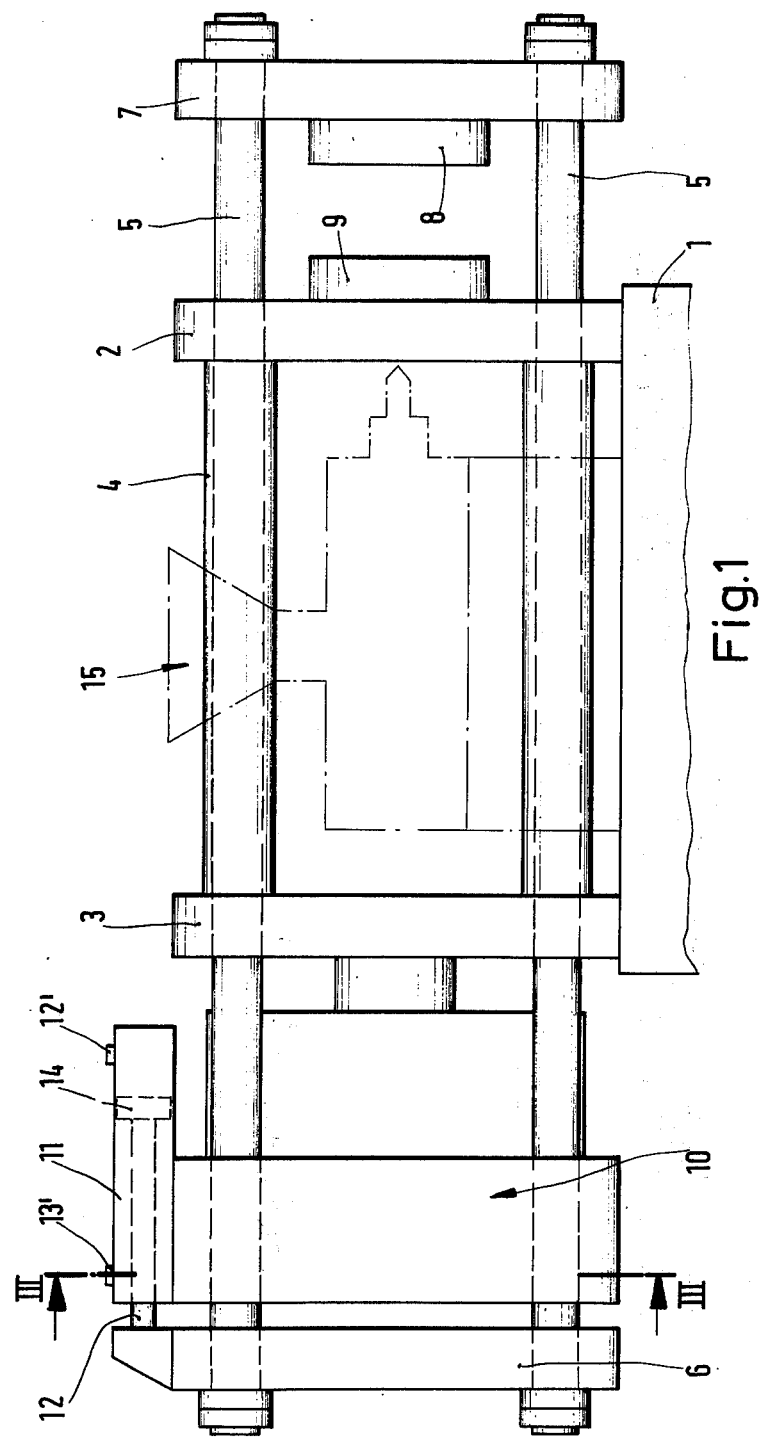
FIG. 1 is a schematic side view of the injection molding machine according to the present invention.

As shown in FIG. 1, the injection molding machine according to the present invention comprises a base plate 1 from which a pair of parallel stationary plates 2 and 3 projects upwardly, spaced from each other and connected to each other by four tubular members 4, of which only the two front members are visible in FIG. 1. The aforementioned stationary plates 2, 3 form, together with the base plate 1 and the tubular members 4 extending between the stationary plates, a stationary frame. A plurality of rods 5 is guided for longitudinal movement in the tubular members 4 and corresponding openings in the stationary plates 2 and 3. The rods 5 project with portions thereof to opposite sides beyond the stationary plates 2 and 3 and carry on the ends thereof a pair of movable plates 6 and 7 forming together with the rods 5 a movable frame. The stationary plate 2 carries, on the side thereof facing the movable plate 7, one part 9 of a split mold, whereas the other part 8 of the split mold is carried on the movable plate 7 aligned with and facing the mold part 9.

Guide means 10 is slidably mounted on the rods 5 between the stationary plate 3 and the movable plate 6. Cylinder and piston means, comprising a cylinder 11 fixed to the guide means 10 and a piston 14 movable in the cylinder 11 and having a piston rod 12 fixed at its free end to the movable plate 6, are provided for moving the movable frame relative to the stationary frame and therewith the two mold parts 8 and 9 between an open and a closed position. The cylinder 11 is provided in the region of opposite ends thereof with connecting sockets 12' and 13' for feeding pressure fluid from a source not shown in the drawing, in and out of the cylinder spaces to opposite sides of the piston 14 therein for reciprocating the latter. Injection means 15, of known construction and only schematically indicated in FIG. 1, is mounted on the base plate 1 of the stationary frame between the stationary plates 2 and 3. This injection means 15 may comprise, as known in the art, a screw spindle guided in a corresponding cylinder which presses the injection material in plasticized form through a non-illustrated bore in the stationary plate 2 and a likewise non-illustrated sprue passage in the mold part 9 into the cavities of the two mold parts, when the mold parts are in the closed position. The injection means 15 is preferably mounted on the base plate movable in longitudinal direction in a base plate guide, not shown in the drawing, and arrestable in any adjusted position.

The guide means 10 comprises a guide frame 20 (FIGS. 2 and 3) of substantially rectangular configuration formed at the inner sides of the corners thereof with semicircular cutouts respectively partly encompassing the rods 5 at corresponding outer portions thereof. Four clamping jaws 21 are guided in the frame 20 for movement in radial direction and these clamping jaws are formed respectively with substantially semicircular cutouts engaging the rods 5 at portions thereof opposite the portions engaged by the cutouts in the frame 20. The clamping jaws 21 are arranged about a clamping cone 12 having a frustoconical outer surface which is engaged by correspondingly formed surfaces of the clamping jaws 21. The clamping cone 12 extends with its large diameter end through a cylindrical opening in the guide frame 20 and a flexible membrane 23 clamped at the outer periphery thereof in the guide frame 20 engages the large diameter end face of the cone 12. The plate means 10 further includes a membrane plate 24 engaging with one of the opposite faces thereof the side of the membrane 23 facing away from the end face of the cone and forms with the membrane 23 a pressure space 25 into which a pressure fluid may be fed through a passage 26, 27 formed in the membrane plate 24 from a source of hydraulic fluid under pressure, not shown in the drawing, to thereby move the clamping cone 12 towards the left, as viewed in FIG. 2 to thus press the clamping jaws 21 in radial direction against the inner face portions of the rods 5.

Figure 2:
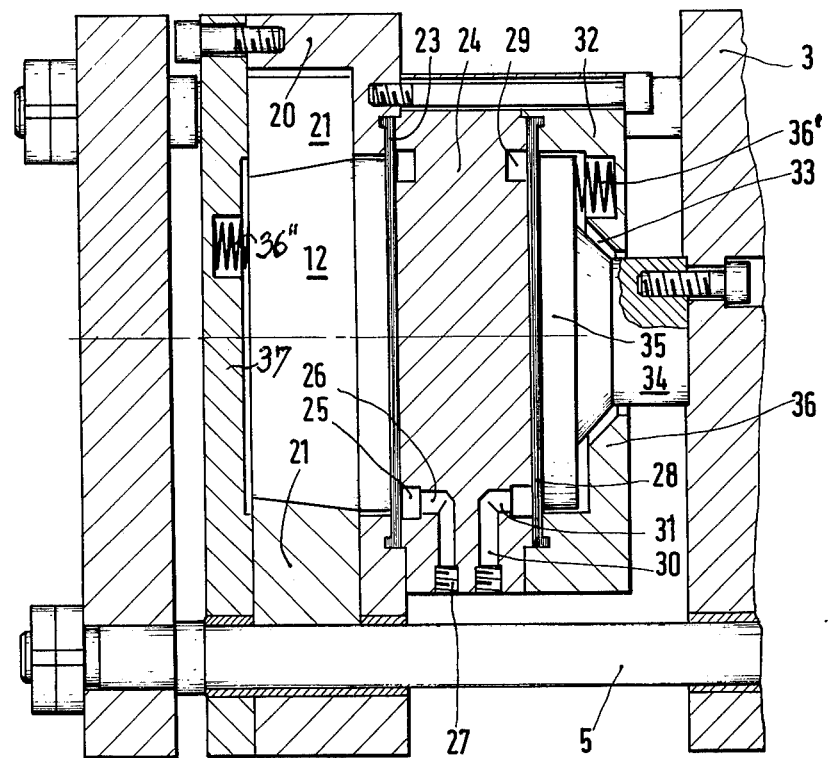
FIG. 2 is a cross-section taken along line II—II of FIG. 3 and showing a detail of the injection molding machine as shown in FIG. 1 on an enlarged scale.
Figure 3:
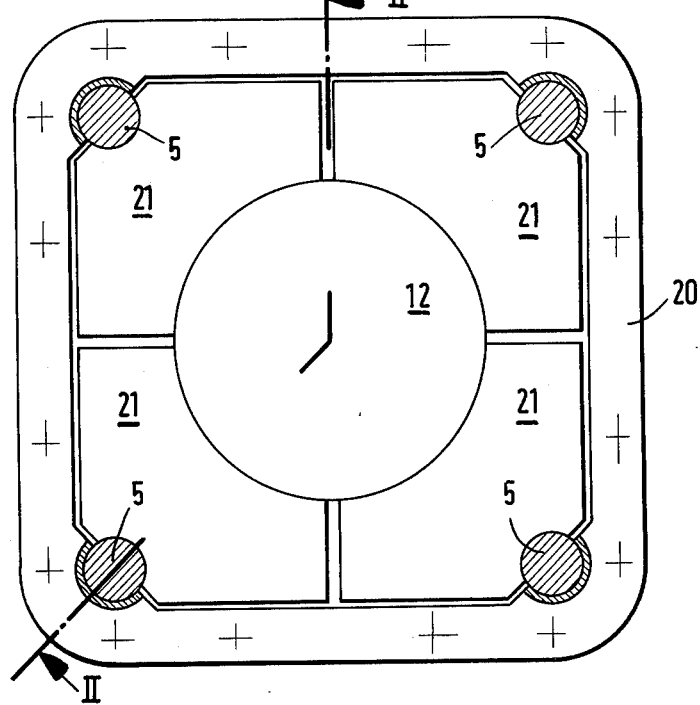
FIG. 3 is a cross-section taken along the line III—III of FIG. 1.

A second membrane 28 abuts against the opposite face of the membrane plate 24 and the outer periphery of the membrane 28 is clamped against the opposite face of the membrane plate 24 by a membrane ring 32 fixedly connected by screws or the like to the guide frame 20. Additional passage means 30, 31 extending through the membrane plate 24 and communicating with an additional pressure space 29 having an open side facing the membrane 28 is adapted to be connected at the outer end thereof to a source of fluid under pressure, not shown in the drawing, which may be the same source which is connected to the passages 26 and 27. The side of the membrane 28 facing away from the membrane plate 24 engages a pressure plate 35 integral with a part conical, part cylindrical member 34 of a smaller maximum diameter than that of the pressure plate 35. The member 34, in turn, is connected by screws or the like to the stationary plate 8, as clearly shown in FIG. 2. The conical part of the member 34 extends with axial and radial clearance through an annular portion 36 of the membrane ring 32. The annular portion 36 has an inner diameter smaller than the outer diameter of the pressure plate 35 and extends axially spaced from the side of the pressure plate 35 facing the stationary plate 3. Feeding pressure fluid into the pressure space 29, after the plate means 10 have been clamped on the rod 5, will therefore provide the necessary counterpressure maintaining the two mold parts 8 and 9 in closed position against the pressure of the material injected thereinto. In order to bring the two membranes 23 and 28 to their rest position, as shown in FIG. 2, after pressure fluid has been discharged from the pressure spaces 25 and 29, at least one compression spring 36' is located in a blind bore of the annular portion 36 of the membrane ring 32 and engaging with opposite ends the pressure plate 35 and the closed end of the aforementioned bore, whereas a corresponding compression spring 36'' is located in a blind bore of a plate 37 connected by screws or the like to the left open end of the guide frame 20, as viewed in FIG. 2, and engaging with opposite ends thereof the small diameter end face of the cone 12 and the closed end of the blind bore in the plate 37.

The above-described injection molding machine is to be operated as follows:

In order to bring the mold parts 8 and 9 to the closed position, pressure fluid is injected in the cylinder and piston means 11, 14 through the connecting socket 12' in the cylinder 11 thereby moving the piston 14 to the left, as viewed in FIG. 1, and the movable frame 5, 6, 7 in the same direction. After the split mold is thus closed, pressure fluid is fed into the pressure space 25, which causes bulging of the membrane 23 towards the left, as viewed in FIG. 2, and corresponding movement of the clamping cone 12 so that the latter will move the clamping jaws 21 in radially outward direction to clamp the plate means 10 against the rods 5. Subsequently thereto pressure fluid is also fed into the pressure space 29, acting through the membrane 28 on the pressure plate 35 connected to the stationary plate 3, while molding material is injected through the injection means 15 into the closed mold. The reaction pressure produced by the pressure fluid fed into the pressure space 29 will therefore produce a force holding the split mold 8, 9 in closed position against the force of the material injected under pressure thereinto.

The injection molding machine according to the present invention constitutes a very compact, space saving construction which, in addition, does not require any further means to adapt the injection molding machine for molds of different size.

It will be understood that each of the elements described above, or two or more together, may also find a useful application in other types of injection molding machines differing from the type described above.

While the invention has been illustrated and described as embodied in an injection molding machine having a stationary frame and a movable frame guided therein, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

We claim:

1. In an injection molding machine, a combination comprising a stationary frame including a stationary mold-mounting plate, a stationary support plate spaced from said stationary mold-mounting plate, and a plurality of axially parallel tubular members connected to and extending between said stationary plates; a movable frame including a plurality of rods each received in one of said tubular members for movement axially thereof and having a first end extending axially beyond said stationary mold-mounting plate and a second end axially beyond said stationary support plate, a movable mold-mounting plate attached to said first ends of said rods, and a movable support plate attached to said second ends of said rods; means for interchangeably mounting one part of a split injection mold on said stationary mold-mounting plate and another part thereof on said movable mold-mounting plate for movement therewith between an open and a closed position of said injection mold; guide means mounted on said rods intermediate said stationary and movable support plates for axial movement of said movable frame relative thereto and connected to said stationary support plate for limited axial displacement relative thereto; means for moving said movable frame relative to said guide means, including at least one cylinderand-piston unit extending between and connected to said movable support plate and said guide means, respectively; means for clamping said guide means to said rods at any location of the latter to thereby arrest said movable frame in a position corresponding to said closed position of said injection mold regardless of axial dimensions of the latter; means for injecting moldable material under pressure into said injection mold in said closed position thereof, whereby said other mold part is subjected to a separating force urging the same axially away from said one mold part; and means for counteracting said separating force, including a membrane plate rigidly connected to one of said guide means and said stationary support plate, a pressure plate rigidly connected to the other of said stationary support plate and said guide means in juxtaposition with said membrane plate, a flexible membrane interposed between said pressure plate and said membrane plate and sealingly connected to the latter to define a pressure space therewith, and means for admitting pressurized medium into said pressure space to act on said membrane plate and on said membrane to deflect the latter against said pressure plate and exert a force on said membrane and pressure plate which at least equals said separating force, whereby said injection mold is maintained in said closed position thereof.

2. Injection molding machine as defined in claim 1, wherein said clamping means comprise a clamping cone mounted in said guide means between said rods for reciprocation in axial direction relative to said rods and a plurality of clamping jaws engaging the conical surface of said clamping cone and being pressed in radial direction against said rods when said cone is displaced in one axial direction, and means for displacing said cone in said one direction.

3. Injection molding machine as defined in claim 2, wherein said guide means comprises a guide frame extending about said rods and engaging outwardly directed peripheral portions thereof, said clamping jaws being guided in said guide frame and arranged for engaging portions of said rods opposite said outer peripheral portions thereof engaged by said guide frame.

4. Injection molding machine as defined in claim 3, wherein said cone has a large diameter end face spaced from and facing said pressure plate, said membrane plate being located between said large diameter end face of said cone and said pressure plate and having a face which faces said end face and said pressure plate, said displacing means including an additional membrane sandwiched between said face of said membrane plate and said end face of said cone and an additional pressure space at said face of said membrane plate and adapted to be supplied with pressure fluid for pressing said additional membrane against said end face of said cone to displace the latter in said one direction.

5. Injection molding machine as defined in claim 4, and including compression springs respectively acting on faces of said pressure plate and said cone facing away from said membranes.

6. Injection molding machines as defined in claim 1, wherein said guide means for said rods include bores in said stationary plates and tubular members aligned with said bores and extending between said stationary plates and fastened thereto.

7. Injection molding machine as defined in claim 1, wherein said stationary frame comprises a base plate, said stationary plates projecting upwardly from said base plate fixedly connected thereto.

8. Injection molding machine as defined in claim 7, wherein said injection means is mounted on said base plate between said stationary plates.

* * * * *